Alan Edwards and
David Gordon Loukes Inventors

By Peter H Smolka
Their Attorney

3,681,042
COATING OF GLASS ON A MOLTEN METAL BATH

Alan Edwards, Widnes, and David Gordon Loukes, Prescot, England, assignors to Pilkington Brothers Limited, Liverpool, Lancashire, England
Filed May 26, 1970, Ser. No. 40,600
Claims priority, application Great Britain, Mar. 24, 1970, 14,255/70
Int. Cl. C03c 17/06; C03b 18/00
U.S. Cl. 65—60                                                  16 Claims

ABSTRACT OF THE DISCLOSURE

A surface of float glass is coated by vaporising a coating material, for example a coating metal, and entraining the vapour in a stream of hot carrier gas, for example nitrogen or argon. The gas-borne coating material is directed towards the glass surface to be coated which surface is at a coating-receptive temperature. A duct for conducting the vapour extends into a tank in which the glass is being formed. The duct includes a trough, located within the tank for confining a molten body of coating material. The duct is heated to a temperature sufficient to release vapour from the molten body.

BACKGROUND OF THE INVENTION

(1) Field of the invention

This invention relates to the coating of glass and more especially to the coating of a glass surface with a metallic coating, for example to impart heat rejection characteristics to the glass or to impart electrical conductivity to the glass surface.

(2) Description of the prior art

It has been customary to use vacuum deposition techniques for the coating of glass surfaces with metals in which techniques metal is vaporised in an enclosure in which a vacuum is maintained and the metal vapour becomes deposited on the glass surface.

Such methods can only be carried out on a small scale and on individual pieces of glass and the provision of vacuum equipment makes the process costly.

It is a main object of the present invention to provide a new method of coating a glass surface with a vaporised coating material which does not employ vacuum techniques.

A further object of the invention is to provide for the deposition of a vaporised metal coating on a glass surface in a continuous process in which a ribbon of flat glass is being continuously produced, for example in the float process.

SUMMARY

The invention provides an improved method and apparatus for coating float glass with a metallic coating, and an improved modified float glass produced by that method. A coating material, for example a coating metal, is vaporised into a stream of inert carrier gas and the gas-borne vapour is directed on to the glass surface to be coated, which surface is at a temperature at which it is receptive to the coating of the material which forms on the glass.

In order to improve the adherence of the metal coating to the glass surface, a first metal coating may be condensed on to the surface of the advancing glass, to act as a keying metal for keying a second metal coating to the glass. The second metal coating is then condensed as a continuous film on to the keying coating, and thereafter a protective fluoride layer is condensed on to the continuous metal film.

DESCRIPTION OF THE PREFERRED EMBODIMENT

Figure 1:
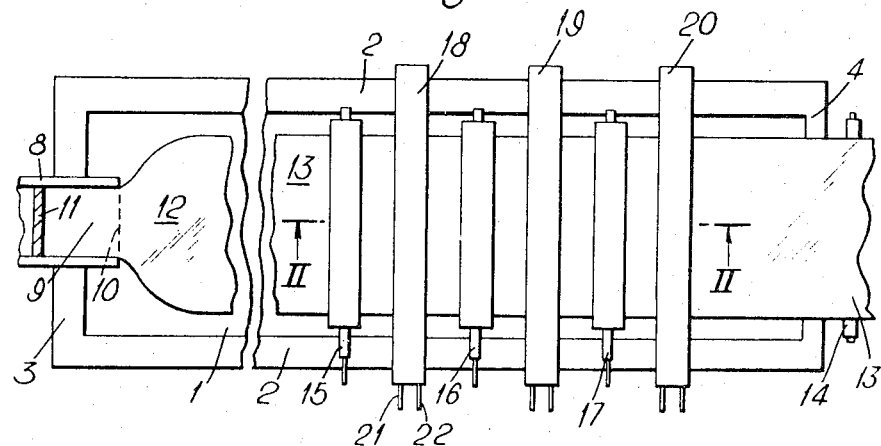
FIG. 1 is a diagrammatic plan view of an elongated float tank structure containing a bath of molten metal and illustrating apparatus according to the invention disposed at the outlet end of the tank structure for producing a multilayer coating on the glass.
Figure 2:
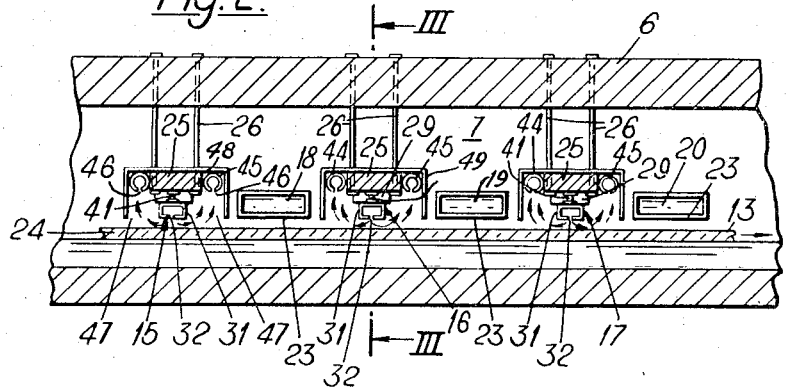
FIG. 2 is a section on line 2—2 of FIG. 1.
Figure 3:
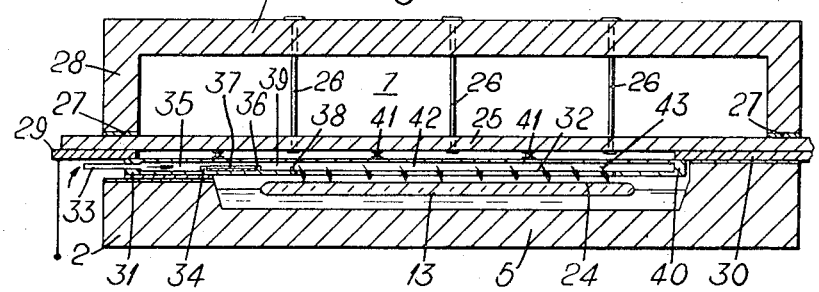
FIG. 3 is a section on line 3—3 of FIG. 2.

FIG. 1 illustrates diagrammatically the production of a ribbon of float glass on a bath of molten metal 1 contained in a tank structure comprising side walls 2, an integral inlet end wall 3 and an integral outlet end wall 4. The walls 2, 3 and 4 are integral with the floor 5 of the tank structure as illustrated in FIGS. 2 and 3, which figures also show a roof structure 6 of usual construction supported over the tank structure to define a headspace 7 over the bath in which headspace a protective atmosphere is maintained at a plenum. Means for supplying the protective atmosphere are now well known and are not illustrated.

A spout 8 projects over the inlet end wall 3 of the tank structure and flow of molten glass 9 along the spout and over the spout lip 10 is controlled by a tweel 11. The molten glass flow establishes a buoyant body 12 of molten glass on the surface of the bath 1 by unhindered lateral flow of the molten glass on the bath. The buoyant body 12 is advanced in ribbon form along the bath and the ribbon of float glass 13 so produced is gradually cooled by temperature regulators, not shown, as it is advanced until it becomes sufficiently stiffened to be taken up from the bath surface and discharged over the outlet end wall 4 on to conveyor rollers, one of which is indicated at 14. The temperature of the glass as it is taken through the outlet from the bath is usually about 650° C. and as the glass ribbon 13 is approaching the outlet end of the bath as illustrated at the right-hand end of FIG. 1 its temperature is about 700 C. At this temperature the glass is receptive to metal coating and the uniformity of the temperature of the ribbon being advanced along the bath makes it ideally suitable for retaining a uniform coating of metal vapour condensed on to the glass surface.

A three stage coating process is employed in the illustrated embodiment, the first coating applied to the glass being a coating of a keying metal which is strongly adhesive to the glass surface and provides a key for the second coating which is the metal to impart desired properties to the glass. Thereafter the coating of a protective fluoride layer is deposited.

The three stage apparatus is mounted as closely as possible to the outlet end of the bath and comprises three coating vapour release ducts 15, 16 and 17 mounted across the bath surface between the side walls 2. After each of the ducts 15, 16 and 17 there is an overhead cooler for cooling the glass surface. Each cooler is a water cooled box and these are indicated at 18, 19 and 20. Each of the water cooled boxes rests on the side walls 2 of the tank structure and extends right across the tank structure and each is provided with water inlet and outlet pipes 21 and 22. Each of the cooling boxes has a flat lower surface 23 which is spaced just above the upper surface 24 of the ribbon of glass 13 so that there is an extensive extraction of heat uniformly across the ribbon width by each of the cooling boxes after each coating has been deposited on the glass surface 24.

Each of the coating vapour release ducts has the same construction which is illustrated in detail in FIGS. 2 and 3.

A refractory beam 25 is supported across the tank structure by hanger bolts 26 which pass upwardly through the roof 6. A packing 27 provides a seal between the bottom of the side legs 28 of the roof structure and the upper surface of the beam 25. The beam is made of electrically insulating material, e.g. silica and rests on massive graphite connecting pieces 29 and 30 which are provided at either side of the tank structure passing through the tank walls to provide electrical connection to either end of the coating vapour release duct 31 which is made of graphite. Each of the ducts 31 is a graphite duct of rectangular section and is formed with a slot 32 in its lower surface facing the upper surface 24 of the glass. The slot 32 as shown in FIG. 3 extends over substantially the whole width of the ribbon of glass 13 whose upper surface 24 is being coated. A carrier gas supply line 33 is connected to one end of the duct and the supply line 33 leads from a supply of inert carrier gas, for example nitrogen or argon. The interior of the duct at this end is formed with three low walls the first of which, 34, defines a preheat zone 35 at the inlet end of the duct. The wall 34 further defines with a second wall 36 a trough for holding a molten body 37 of coating material. Thereafter between the wall 36 and a third wall 38 there is a mixing zone 39.

The other end of the duct is closed at 40 which duct end is in electrical contact with the graphite connecting piece 30. The graphite connecting piece 29 is in electrical connection with the inlet end of the duct and along its length the duct is held to the bottom of the refractory beam by short struts 41.

Electrical connection is made from a power source to the graphite connectors 29 and 30 and heating current is passed through the graphite duct to maintain the temperature right over the duct well above the melting point of the coating material 37. This temperature is such that the coating material in the trough has an appreciable vapour pressure at that temperature. The hot environment in the region of the outlet end of the bath maintains the temperature in any case at about 700° C.

The carrier gas supplied through the line 33 is heated to the high temperature of the ducts, e.g. 2000° C. in the preheat zone 35 and thereafter flows over the low wall 34 in the direction of the arrows and over the trough 37 of molten material from which coating material is being vaporised. This vapour is entrained in the hot carrier gas and the gas-borne vapour flows into the mixing zone 29 where there is turbulence and thorough mixing is produced. Thereafter the gas-borne vapour is carried to the slotted part 42 of the duct and the whole of the duct, being maintained at a temperature above the melting point of the coating material, there is no risk of condensation within the duct. The dimensions of the slot 32 relative to the dimensions of the chamber 42 are such that there is a uniform release of gas-borne vapour towards the glass surface 24 across the whole width of the ribbon as illustrated by the arrows 43. This release of vapour is uniform over the useful width of the ribbon and the margins which are in any case eventually trimmed from the ribbon do not receive the uniform coating.

The closed end of the duct will also be full of the gas-borne vapour but there is no condensation because the whole of the duct is at the high temperature.

Mounted one on each side of the refractory beam 25 are extract ducts 44 and 45 illustrated in FIG. 2. These extract ducts extend along the whole length of the beam and are connected to a gas extraction system located outside the tank structure through an intermediate condensation plant in which any excess of the gas-borne vapours is condensed.

Each of the ducts 44 and 45 has an extract slot 46 parallel to and co-extensive with the vapour release slot 32 in the graphite duct 31 and excess vapours are extracted through the slots 46 at each side of the release duct as indicated by the arrows 47. This prevents any excess vapour from being condensed on other parts of the apparatus and also delimits a zone of treatment of the glass surface advancing beneath the region of release of vapour from the slot 32 towards the glass surface.

A hood comprising a roof 48 and side walls 49 shrouds the whole of this arrangement of vapour release duct and extract ducts. The side walls 49 extend close to the glass surface 24 and this further avoids escape of excess vapours into the headspace 7.

The ribbon of glass approaches the first release duct at a temperature of about 700° C. and in this duct 15 a molten body of a palladium/nickel alloy is maintained molten. The alloy consists of 40% palladium and 60% nickel. When treating a ribbon of glass 400 cm. wide moving at 6 m. to 6.5 m. per minute, a rate of flow of carrier gas, e.g. argon, of about 55 m.$^3$ per hous is employed, and the combined vapour pressure of vaporised palladium and nickel in the gas flow is about 1 mm. of mercury.

This gas-borne vapour is released from the slot 32 in the first duct towards the upper surface 24 and during the passage of the ribbon beneath the slot at the speed of 6 m. to 6.5 m. per minute a keying layer of the palladium/nickel alloy about 0.01 micron thick is condensed uniformly on to the glass surface.

This layer adheres very well to the glass and provides a keying layer for the deposition of the next coating. Tungsten, palladium alone or nickel alone may also be used for this keying layer. The upper surface 24 of the glass has necessarily become heated as it receives this first coating and is cooled beneath the first water box 18 to about 700° C. and passes beneath the next gas release duct at that temperature. In the second stage of treatment beneath the duct 16 the glass receives a continuous film of gold. Molten gold is maintained in the trough 37 and the temperature of the duct is 2000° C. The rate of gas flow is again about 55 m.$^3$ per hour giving a vapour pressure of about 5 mm. of mercury in the gas borne vapour. The gold is condensed on to the keying layer as a continuous film about 0.03 micron thick and the concentration of gold is carefully controlled to produce a layer having for example a desired electrical conductivity or give particular solar heat reflecting properties.

Thereafter the glass surface is again cooled beneath the second cooler 19 to a temperature again of about 700° C. before passage beneath the third duct 17 which contains a molten body of magnesium fluoride which fluoride is released on to the gold film to condense an outer protective layer of magnesium fluoride on to the surface of the gold film.

The temperature of this third duct 17 is about 1900° C.

The fluoride layer protects the metal film from oxidation during subsequent treatment, e.g. annealing or toughening, especially when the film is of a reactive metal, e.g. copper or silver. Further the fluoride layer protects the metal film from scratching in service and helps to stabilise the metal film and counteracts tendencies for the metal of the film to agglomerate.

Thereafter the glass surface is again cooled beneath the water box 20 and the coated ribbon is further cooled to about 650° C. for discharge from the bath on the conveyor rollers 14. This third water box 20 may be dispensed with.

Other metals which may be deposited on to the keying layer as a continuous film are aluminium, copper, silver or tin and the outer protective layer may be calcium fluoride as an alternative to magnesium fluoride.

Further a tin oxide coating may be deposited as the third coating to provide a protective layer although a fluoride layer has been found particularly effective. Tin oxide may however be used for protecting a gold film since there is no problem of oxidation of the gold in the course of deposition of the oxide.

The production by the method of the invention of a coated glass, particularly coated float glass gives a strongly adherent and uniform coating to the glass. The carrying out of all three steps close to the exit end of the float bath using an inert hot carrier gas to carry the coating materials in their vapour form to the glass surface, and the vaporisation of the coating material which takes place in the duct within the tank structure and is then immediately released towards the glass surface overcomes difficulties of conducting hot vapours of metals or other coating materials over any distance and ensures that a uniform concentration of metal vapour or other coating material reaches the glass surface without any danger of condensed specks of the material being carried on to the surface. All the condensation takes place on the glass surface.

We claim:

1. A method of coating a surface of float glass with a continuous coating comprising the steps of advancing glass in ribbon form within a tank structure along a bath of molten metal; maintaining a protective atmosphere at a plenum over the bath; locating within said tank structure adjacent the path of travel of the ribbon of glass a confined molten body of material for coating the glass; heating the molten body to a temperature sufficient to release vapour therefrom; causing a heated carrier gas to be directed across the molten body to entrain released vapour in a stream of the carrier gas while maintaining said molten body and gas-borne vapour segregated from the protective atmosphere over the bath; cooling the upper surface of the glass to a temperature in the range 600° C. to 750° C.; releasing a stream of the gas-borne vapour downwardly towards a zone of treatment of the cooled glass surface uniformly across the width of the upper surface of the glass in a manner causing vapour to condense on the cooled glass surface to form a continuous film thereon; and extracting excess vapours from at least one location spaced from said released stream of gas-borne vapour.

2. A method according to claim 1 wherein said step of extracting comprises the step of extracting excess vapours at locations upstream and downstream of said released stream of gas-borne vapour.

3. A method according to claim 2, including the steps of advancing the ribbon of glass through a first said zone of treatment and condensing a first metal coating onto the surface of the advancing glass to act as a keying metal for keying a second metal to be coated to the glass; subsequently advancing the ribbon of glass through a second said zone of treatment and condensing as a continuous film the second metal coating onto the keying coating; and subsequently advancing the ribbon of glass through a third said zone of treatment and condensing a protective fluoride layer onto the continuous metal film.

4. A method of coating a surface of float glass with a continuous metal coating comprising the steps of advancing glass in ribbon form along a bath of molten metal; maintaining a protective atmosphere at a plenum over the bath; cooling the advancing glass to 700° C.; locating a confined molten body of a palladium/nickel alloy adjacent the path of travel of the cooled ribbon along the bath; heating the molten alloy to release metal vapour therefrom; directing a heated carrier gas across the molten alloy body to entrain the metal vapour in a stream of the carrier gas; segregating said molten alloy body and gas-borne vapour from the protective atmosphere over the bath; releasing a stream of the gas-borne palladium/nickel vapour downwardly towards a first zone of treatment of the glass surface uniformly across the width of the upper surface of the glass which vapour condenses to form a keying coating of palladium/nickel on the glass; re-cooling the coated surface of the advancing ribbon of glass to 700° C.; locating a confined molten body of gold adjacent the path of travel of the re-cooled ribbon; heating the molten gold to release gold vapour therefrom; directing a heated carrier gas across the molten gold to entrain gold vapour in a stream of the carrier gas; segregating said molten gold and gas-borne gold vapour from the protective atmosphere over the bath; releasing a stream of the gas-borne gold vapour downwardly towards a second zone of treatment of the glass surface uniformly across the width of the upper surface of the glass which vapour condenses to form a gold film on the keying coating; again cooling the coated surface of the advancing ribbon to 700° C.; locating a confined molten body of a fluoride adjacent the path of travel of the cooled coated ribbon; heating the molten fluoride to release vapour therefrom; directing a heated carrier gas across the molten fluoride to entrain fluoride vapour in a stream of carrier gas; segregating said molten fluoride and gas-borne fluoride vapour from the protective atmosphere over the bath; releasing a stream of the gas-borne fluoride vapour downwardly towards a third zone of treatment of the glass surface uniformly across the width of the upper surface of the glass which vapour condenses to form a protective fluoride layer on the gold film; again cooling the coated surface prior to discharge from the bath; and extracting excess vapours at locations upstream and downstream of each said released streams of gas-borne vapour to delimit said zones of treatment.

5. Apparatus for coating the upper surface of a ribbon of float glass, comprising:
(a) an elongated tank structure containing a bath of molten metal over which a plenum of protective atmosphere is maintained,
(b) means for delivering glass to the bath and advancing the glass in ribbon form along the bath,
(c) a coating vapour release duct extending within and mounted across the tank structure, said duct being closed at one end and being provided with:
(i) a slot in its undersurface for releasing coating vapour downwardly toward the upper surface of the ribbon of glass, and
(ii) a trough in the duct floor near the other end of the duct and within the confines of the tank structure, for holding a molten body of coating material,
(d) a carrier gas supply line connected to said other end of the duct, and
(e) heating means for heating the duct to maintain the molten body of coating material at a vapour release temperature and to tend to prevent condensation along the slotted part of the duct.

6. Apparatus according to claim 5 wherein said release duct is positioned near to the outlet end of said tank structure.

7. A method according to claim 3, wherein the keying metal for the first metal coating is a metal selected from the group consisting of tungsten, silver, chromium, palladium, nickel, and palladium/nickel alloys.

8. A method according to claim 3, wherein the second metal coating is of a metal selected from the group consisting of aluminium, copper, silver, tin and gold.

9. A method according to claim 3, including cooling the glass surface immediately before the condensation of each coating on to the glass.

10. A method according to claim 4, wherein the fluoride is magnesium fluoride.

11. A method according to claim 4, wherein the fluoride is calcium fluoride.

12. A method according to claim 2, wherein the carrier gas is nitrogen.

13. A method according to claim 2, wherein the carrier gas is argon.

14. Apparatus according to claim 6, including in said other end of the duct, means defining a preheat zone for heating the carrier gas prior to its passage over the trough, and means defining a mixing zone between the trough and the slotted part of the duct.

15. Apparatus according to claim 6, comprising three said ducts spaced apart at the outlet end of the tank structure and each followed by an overhead cooler mounted near the bath surface to cool the upper surface of the ribbon of glass after each coating has been applied.

16. Apparatus according to claim 6, wherein each coating vapour release duct is a hollow graphite member which is carried from a refractory beam mounted across the tank structure, graphite connecting pieces lead through the tank side walls to connect electrically to the ends of the graphite duct for the passage of heating current through the duct, and extraction ducts are mounted one on each side of the refractory beam with extraction slots parallel to and co-extensive with the vapour release slot in the graphite duct to extract excess vapours at each side of the release duct thereby delimiting a zone of treatment of the glass surface.

References Cited

UNITED STATES PATENTS

| | | | |
|---|---|---|---|
| 3,413,605 | 12/1946 | Colbert et al. | 117—35 V |
| 2,904,432 | 9/1959 | Ross et al. | 65—30 X |
| 3,142,567 | 7/1964 | Morse | 117—71 R |
| 3,314,393 | 4/1967 | Haneta | 118—48 |
| 3,567,414 | 3/1971 | Lajarte | 65—65 A |
| 3,505,049 | 4/1970 | Plumat | 65—30 |
| 3,088,850 | 5/1963 | Birchard et al. | 117—211 |

ROBERT L. LINDSAY, JR., Primary Examiner

U.S. Cl. X.R.

65—99 A, 182 R; 117—71 R, 107.1; 118—48